US012482931B2

(12) United States Patent
Lee

(10) Patent No.: US 12,482,931 B2
(45) Date of Patent: Nov. 25, 2025

(54) SWITCHING ANTENNA FOR VEHICULAR UWB COMMUNICATION

(71) Applicant: HYUNDAI MOBIS CO., LTD., Seoul (KR)

(72) Inventor: Yoon Jin Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 168 days.

(21) Appl. No.: 18/237,124

(22) Filed: Aug. 23, 2023

(65) Prior Publication Data

US 2024/0072433 A1 Feb. 29, 2024

(30) Foreign Application Priority Data

Aug. 31, 2022 (KR) ........................ 10-2022-0110041

(51) Int. Cl.
*H01Q 3/24* (2006.01)
*H01Q 21/29* (2006.01)

(52) U.S. Cl.
CPC ............... *H01Q 3/24* (2013.01); *H01Q 21/29* (2013.01)

(58) Field of Classification Search
CPC ........ H01Q 3/24; H01Q 21/29; H01Q 1/3291; H01Q 1/38; H01Q 1/48; H01Q 9/40; H01Q 19/005; H01Q 5/25; H01Q 1/325
See application file for complete search history.

(56) References Cited

U.S. PATENT DOCUMENTS

| | | | | |
|---|---|---|---|---|
| 4,063,246 A * | 12/1977 | Greiser | H01Q 21/065 343/846 |
| 7,439,912 B2 * | 10/2008 | Shih | H01Q 1/38 343/700 MS |
| 2007/0120741 A1 * | 5/2007 | Tseng | H01Q 9/40 343/700 MS |
| 2018/0269566 A1 * | 9/2018 | Kerselaers | H01Q 1/38 |
| 2019/0044230 A1 * | 2/2019 | Zaric | H01Q 9/40 |
| 2021/0111486 A1 * | 4/2021 | Tamrakar | H01Q 1/2266 |
| 2022/0336951 A1 * | 10/2022 | Tlusty | H01Q 5/10 |

(Continued)

FOREIGN PATENT DOCUMENTS

| | | | |
|---|---|---|---|
| CN | 105305055 B * | 1/2018 | |
| CN | 112018510 A * | 12/2020 | H01Q 1/38 |
| EP | 3376594 A1 * | 9/2018 | H01Q 1/32 |

(Continued)

*Primary Examiner* — Seokjin Kim
(74) *Attorney, Agent, or Firm* — Morgan, Lewis & Bockius LLP

(57) ABSTRACT

Proposed is a switching antenna for vehicular UWB communication, the switching antenna including a substrate, a radiation unit formed on the substrate and configured to radiate a non-directional pattern signal, a main grounding unit formed on the substrate in a manner that is arranged under the radiation unit, a first side grounding unit formed on the substrate in a manner that is arranged to the left of the radiation unit, a second side grounding unit formed on the substrate in a manner that is arranged to the right of the radiation unit, a first selection signal unit formed on the substrate in a manner that selectively connects the main grounding unit and the first side grounding unit to each other, and a second selection signal unit formed on the substrate in a manner that selectively connects the main grounding unit and the second side grounding unit to each other.

19 Claims, 10 Drawing Sheets

1

(56) References Cited

U.S. PATENT DOCUMENTS

2024/0079768 A1 * 3/2024 Lee .......................... G01S 13/765

FOREIGN PATENT DOCUMENTS

| | | | | | |
|---|---|---|---|---|---|
| KR | 20050091767 A | * | 9/2005 | | |
| KR | 10-2021-0039941 A | | 4/2021 | | |
| KR | 20220125207 A | * | 9/2022 | | |
| WO | WO-2023063455 A1 | * | 4/2023 | ............... | H01Q 1/24 |

* cited by examiner

SWITCHING ANTENNA FOR VEHICULAR UWB COMMUNICATION

CROSS-REFERENCE TO RELATED APPLICATION

This application claims priority from and the benefit of Korean Patent Application No. 10-2022-0110041, filed on Aug. 31, 2022, which is hereby incorporated by reference for all purposes as if set forth herein.

BACKGROUND

Field

Exemplary embodiments of the present disclosure relate to a switching antenna for vehicular UWB communication and, more particularly, to a switching antenna for vehicular UWB communication, the switching antenna being capable of performing location positioning or detecting an occupant sitting on a rear seat through a signal that is selectively radiated by a directional antenna or a non-directional antenna.

Discussion of the Background

Typically, ultra-wideband (UWB) antennas refer to short-distance wireless communication antennas that are capable of transmitting and receiving data by making wireless connections to peripheral devices in limited spaces, such as offices, houses, and vehicles.

The UWB antennas are short-distance wireless communication devices that are capable of performing high-speed communication in a frequency band much broader than a frequency band available for typical antenna devices, but with less energy. It is possible that the UWB antennas transmit data at up to several hundreds of megabits per second (Mbps) to several gigabits per second (Gbps) within a radius of 10 m.

In order to prevent interference with other communication systems, the UWB antennas transmit signals by distributing the energy of the signal over a frequency band spanning several gigahertz (GHz). The UWB antennas are capable of performing communication regardless of frequencies without causing any interference with signals in other narrow bands. The UWB antennas are robust to noise, have a high data transmission rate, and consume less electric power.

Antennas of UWB modules used in vehicles for location positioning are non-directional, while antennas for UWB modules performing a UWB radar function of detecting an occupant sitting on a rear seat are directional.

However, current non-directional and directional antennas have different characteristics. As a result, the problem arises that antennas for two UWB modules need to be manufactured separately for their respective uses. Therefore, it is necessary to find a solution to this problem.

The related art of the present disclosure is disclosed in Korean Patent No. 2021-0039941 (published on Apr. 21, 2021 and entitled "Omni-Directional Ultra-Wideband Antenna Device")

SUMMARY

Various embodiments, which are contrived to find a solution to the above-mentioned problem, are directed to a switching antenna for vehicular UWB communication, the switching antenna being capable of performing location positioning or detecting an occupant sitting on a rear seat through a signal that is selectively radiated by a directional antenna or a non-directional antenna.

In an embodiment, a switching antenna for vehicular UWB communication includes: a substrate; a radiation unit formed on the substrate and configured to radiate a non-directional pattern signal; a main grounding unit formed on the substrate in a manner that is arranged under the radiation unit; a first side grounding unit formed on the substrate in a manner that is arranged to the left of the radiation unit; a second side grounding unit formed on the substrate in a manner that is arranged to the right of the radiation unit; a first selection signal unit formed on the substrate in a manner that selectively connects the main grounding unit and the first side grounding unit to each other; and a second selection signal unit formed on the substrate in a manner that selectively connects the main grounding unit and the second side grounding unit to each other.

In an embodiment, in the switching antenna, the radiation unit may form a pattern on an upper surface of the substrate.

In an embodiment, in the switching antenna, the radiation unit may include: a radiation feed unit extending from one end of the substrate to the center of the substrate and applying electric power; and a radiation antenna unit connected to the radiation feed unit and configured to radiate a non-directional signal according to an electric signal of the radiation feed unit.

In an embodiment, in the switching antenna, the radiation feed unit may be bar-shaped and may be connected to a circuit on the substrate.

In an embodiment, in the switching antenna, the radiation antenna unit may include: a first radiation unit in the shape of a circle in a manner that is connected to the radiation feed unit; and a second radiation unit being symmetrical at an edge of the first radiation unit.

In an embodiment, in the switching antenna, the main grounding unit may be formed on a rear surface of the substrate in a manner that is arranged under the radiation unit, thereby blocking a radiation signal of the radiation unit.

In an embodiment, in the switching antenna, the main grounding unit may include a first main grounding sub-unit formed on the opposite side of the substrate in a manner that extends in opposite directions from the substrate up to both ends of the substrate; and a second main grounding sub-unit concavely formed on top of the first main grounding sub-unit in such a manner as not to interfere with the radiation antenna unit.

In an embodiment, in the switching antenna, the first main grounding sub-unit may be formed in a manner that extends over a distance in the leftward-rightward direction of the substrate, and an upper end of the first main grounding sub-unit may have a greater height than the radiation feed unit and a smaller height than the center point of the radiation antenna unit.

In an embodiment, in the switching antenna, the main grounding unit may include: a first primary grounding sub-unit formed on the opposite side of the substrate; a second primary grounding sub-unit concavely formed on top of the first primary grounding sub-unit in such a manner as not to interfere with the radiation antenna unit; a third primary grounding sub-unit on the opposite side of the substrate in a manner that is arranged on the left-side edge of the substrate; and a fourth primary grounding sub-unit formed on the opposite side of the substrate in a manner that is arranged on the right-side edge of the substrate.

In an embodiment, in the switching antenna, the first primary grounding sub-unit may be formed in a manner that extends over a distance in the leftward-rightward direction of the substrate, so that both ends thereof are spaced away from the left-side and right-side edges, respectively, of the substrate.

In an embodiment, in the switching antenna, an upper end of the first primary grounding sub-unit may have a greater height than the radiation feed unit and a smaller height than the center point of the radiation antenna unit.

In an embodiment, in the switching antenna, the third primary grounding sub-unit may include: a third vertical grounding sub-element extending over a distance from the left-side edge of the substrate; and a third horizontal grounding sub-element extending inward in the lateral direction from the third vertical grounding sub-element, and the third primary grounding sub-unit may be spaced away from or connected to the first primary grounding sub-unit.

In an embodiment, in the switching antenna, the fourth primary grounding sub-unit may include: a fourth vertical grounding sub-element extending a distance in the upward-downward direction from the right-side edge of the substrate; and a fourth horizontal grounding sub-element extending inward in the lateral direction from the fourth vertical grounding sub-element, and the fourth primary grounding sub-unit may be spaced away from or connected to the first primary grounding sub-unit.

In an embodiment, in the switching antenna, the first side grounding unit may be formed in a manner that extends over a distance in the upward-downward direction from the left-side edge of the substrate, thereby blocking a radiation signal by covering the left side of the radiation unit.

In an embodiment, in the switching antenna, the second side grounding unit may be formed in a manner that extends over a distance in the upward-downward direction from the right-side edge of the substrate, thereby blocking a radiation signal by covering the right side of the radiation unit.

In an embodiment, in the switching antenna, the first selection signal unit may include: a first signal pattern unit connecting the main grounding unit and the first side grounding unit to each other; and a first signal application unit connected to the first signal pattern unit and configured to apply electric power to the first signal pattern unit.

In an embodiment, in the switching antenna, the second selection signal unit may include: a second signal pattern unit connecting the main grounding unit and the second side grounding unit to each other; and a second signal application unit connected to the second signal pattern unit and configured to apply electric power to the second signal pattern unit.

In an embodiment, in the switching antenna, a radiation signal may be directional when the first selection signal unit connects the main grounding unit and the first side grounding unit to each other and when the second selection signal unit connects the main grounding unit and the second side grounding unit to each other.

In an embodiment, in the switching antenna, a radiation signal may be non-directional when the first selection signal unit disconnects the main grounding unit and the first side grounding unit from each other and when the second selection signal unit disconnects the main grounding unit and the second side grounding unit from each other.

In an embodiment, in the switching antenna, a radiation signal of the radiation unit may be so directional that a trunk is detectable, if the second selection signal unit disconnects the main grounding unit and the second side grounding unit from each other when the first selection signal unit connects the main grounding unit and the first side grounding unit to each other, or if the second selection signal unit connects the main grounding unit and the second side grounding unit when the first selection signal unit disconnects the main grounding unit and the first side grounding unit from each other.

In the switching antenna for vehicular UWB communication according to the present disclosure, the main grounding unit is formed under the radiation unit that radiates the non-directional radiation signal, and the first side grounding unit and the second grounding unit are formed on both sides, respectively, of the radiation unit. Then, the main grounding unit and the first side grounding unit are selectively connected to or separated from each other by the first selection signal unit. In addition, the main grounding unit and the second grounding unit are selectively connected to or separated from each other by the second selection signal unit. As a result, the non-directional radiation signal or the directional radiation signal can be radiated.

DETAILED DESCRIPTION OF THE ILLUSTRATED EMBODIMENTS

Figure 1:
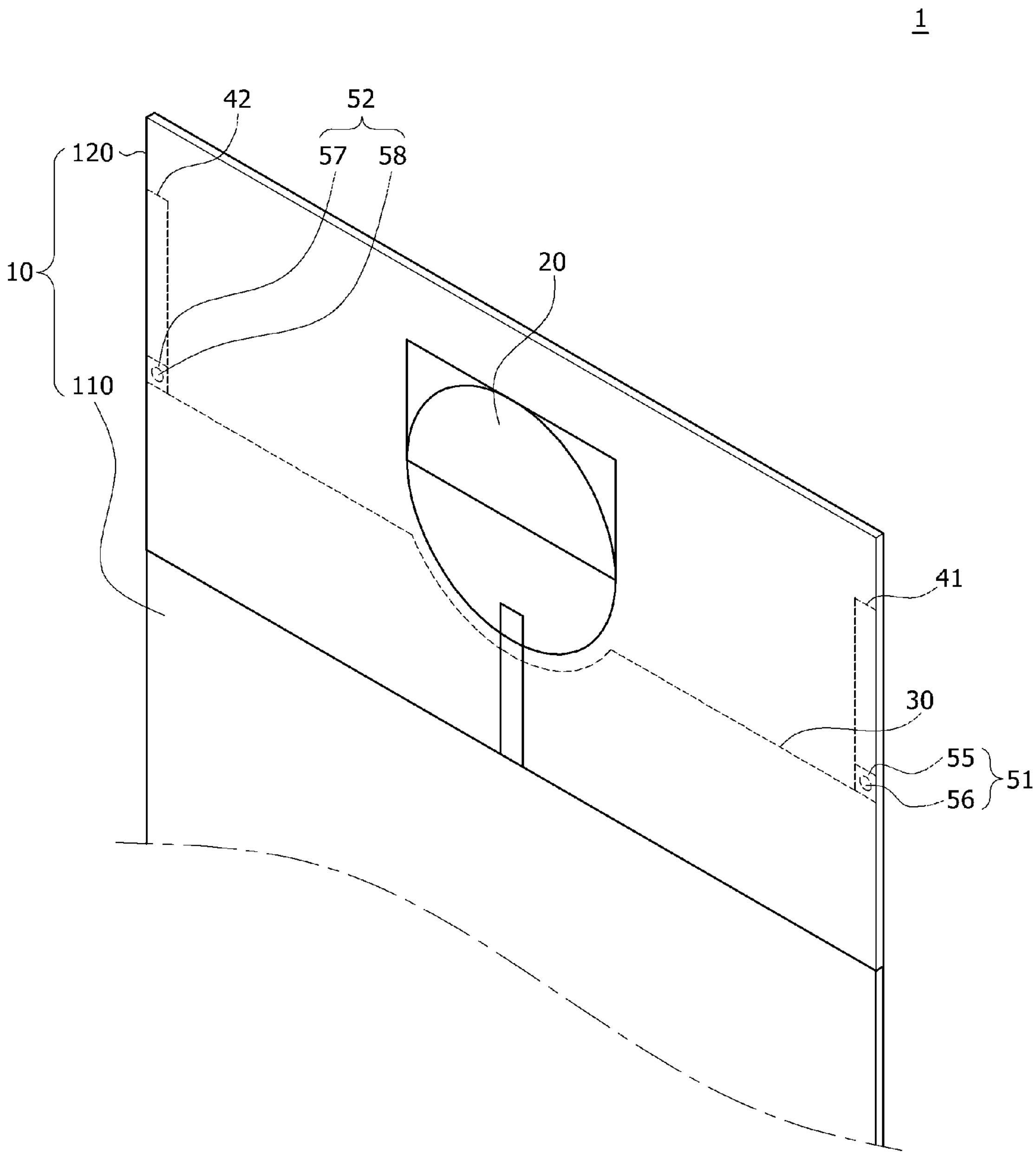
FIG. 1 is a view schematically illustrating a switching antenna for vehicular UWB communication according to an embodiment of the present disclosure.

A switching antenna for vehicular UWB communication according to an embodiment of the present disclosure will be described below with reference to the accompanying drawings. For clarity and convenience in description, thicknesses of lines, sizes of constituent elements, and the like may be illustrated in non-exact proportion in the drawings. In addition, a term to be assigned to a constituent element according to the present disclosure is defined considering a function of the constituent element and may vary according to a user's intention or a manager's intention or based on practices in the art. Therefore, the term should be defined in context in light of the present specification.

FIG. 1 is a view schematically illustrating a switching antenna 1 for vehicular UWB communication according to an embodiment of the present disclosure. With reference to FIG. 1, the switching antenna 1 for vehicular UWB communication includes a substrate 10, a radiation unit 20, a main grounding unit 30, a first side grounding unit 41, a second side grounding unit 42, a first selection signal unit 51, and a second selection signal unit 52.

The substrate 10 may be manufactured of resin material, and one portion of a flat surface thereof may be partitioned into a substrate circuit unit 110 into which a circuit is built and a substrate antenna unit 120 on which an antenna is formed. The substrate 10 may be formed by forming a plurality of layers and joining them together or by injection molding. In addition, a pattern antenna may be formed on one surface of the substrate 10, and a circuit may be formed on the opposite surface of the substrate 10.

The radiation unit 20 may be formed on the substrate 10 and may radiate a non-directional pattern signal. As an example, the radiation unit 20 may form a pattern on an upper surface of the substrate 10. The radiation unit 20 may be arranged on the substrate antenna unit 120 in a manner that is connected to the substrate circuit unit 110.

The main grounding unit 30 may be formed on the substrate in a manner that is arranged under the radiation unit 20. As an example, the main grounding unit 30 may be formed on a rear surface of the substrate 10 in a manner that is arranged under the radiation unit 20, thereby blocking a radiation signal of the radiation unit 20.

The first side grounding unit 41 may be formed on the substrate 10 in a manner that is arranged to the left side of the radiation unit 20. As an example, the first side grounding unit 41 may be formed on the rear surface of the substrate 10 in a manner that covers the left side of the radiation unit 20 when viewed from behind the substrate 10, thereby blocking the radiation signal. The first side grounding unit 41 may be formed in such a manner that it extends over a distance in the upward-downward direction from the left-side edge of the substrate 10.

The second side grounding unit 42 may be formed on the substrate 10 in a manner that is arranged to the right side of the radiation unit 20. As an example, the second side grounding unit 42 may be formed on the rear surface of the substrate 10 in a manner that covers the right side of the radiation unit 20 when viewed from behind the substrate 10, thereby blocking the radiation signal. The second side grounding unit 42 may be formed in such a manner that it extends over a predetermined distance in the upward-downward direction from the right side edge of the substrate 10.

The first selection signal unit 51 may be formed on the substrate 10 in a manner that selectivity connects the main grounding unit 30 and the first side grounding unit 41 to each other and thus adjusts the radiation signal of the radiation unit 20. As an example, the first selection signal unit 51 may be formed on the substrate 10 in a manner that selectively blocks the radiation signal of the radiation unit 20 and thus guides radiating of a non-directional radiation signal of the radiation unit 20 or a directional radiation signal into which the non-directional radiation signal transforms. The first selection signal unit 51 may include a first signal pattern unit 55 and a first signal application unit 56. The first signal pattern unit 55 is formed on the rear surface of the substrate 10 in a manner that connects the main grounding unit 30 and the first side grounding unit 41 to each other. The first signal application unit 56 is connected to the first signal pattern unit 55 and applies electric power to the first signal pattern unit 55. The first signal application unit 56 may be built into the substrate antenna unit 120 and may be connected to the substrate circuit unit 110, thereby being supplied with electric power. The first signal application unit 56 may be a pin diode that is built into the substrate 10. Wiring for controlling the pin diode control is arranged on the third layer and the fourth layer of the substrate 10. In cases where the wiring needs to pass through a layer other than the third layer and the fourth layer, a via hole may be formed.

The second selection signal unit 52 may be formed on the substrate 10 in a manner that selectivity connects the main grounding unit 30 and the second side grounding unit 42 to each other, thereby adjusting the radiation signal of the radiation unit 20. As an example, the second selection signal unit 52 may be formed on the substrate 10 in a manner that selectively blocks the radiation signal of the radiation unit 20 and thus guides the radiating of the non-directional radiation signal of the radiation unit 20 or the directional radiation signal into which the non-directional radiation signal transforms. The second selection signal unit 52 may include a second signal pattern unit 57 and a second signal application unit 58. The second signal pattern unit 57 is formed on the rear surface of the substrate 10 in a manner that connects the main grounding unit 30 and the second side grounding unit 42 to each other. The second signal application unit 58 is connected to the second signal pattern unit 57 and applies electric power to the second signal pattern unit 57. The second signal application unit 58 may be built into the substrate antenna unit 120 and may be connected to the substrate circuit unit 110, thereby being supplied with electric power. The second signal application unit 58 may be a pin diode that is built into the substrate 10. Wiring for controlling the pin diode control is arranged on the third layer and the fourth layer of the substrate 10. In cases where the wiring needs to pass through a layer other than the third layer and the fourth layer, a via hole may be formed.

Figure 2:
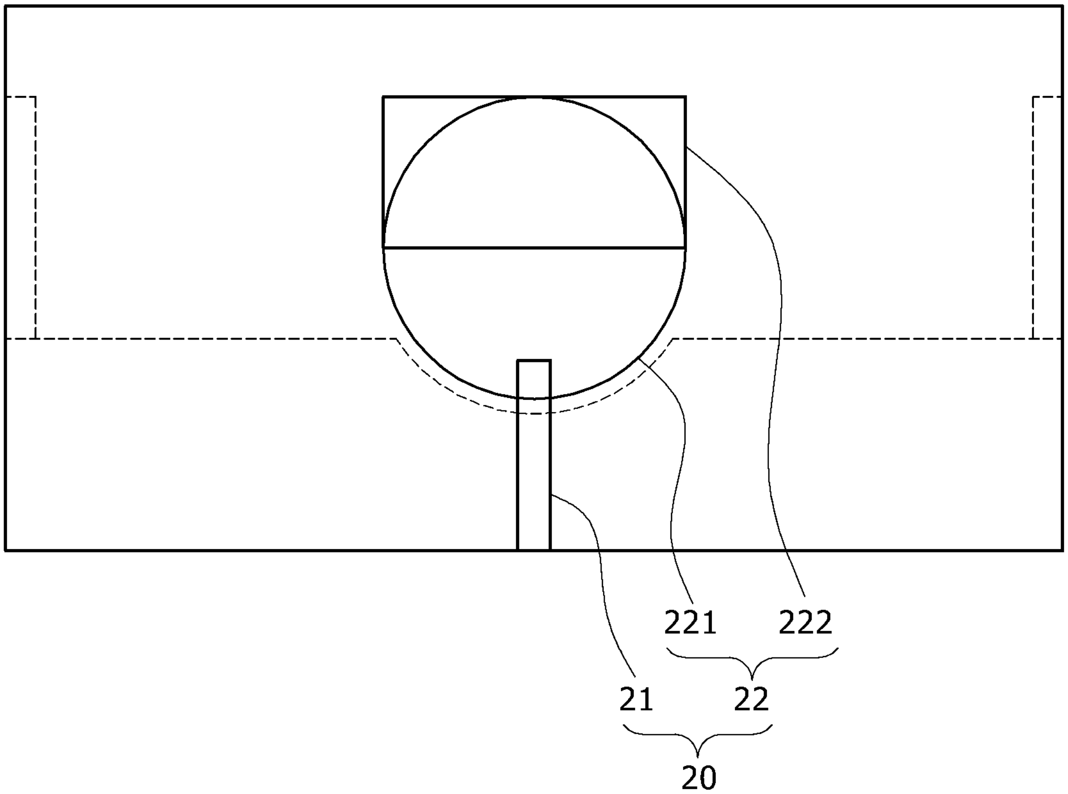
FIG. 2 is a view schematically illustrating a radiation unit according to an embodiment of the present disclosure.

FIG. 2 is a view schematically illustrating the radiation unit 20 according to an embodiment of the present disclosure. With reference to FIG. 2, the radiation unit 20 according to the embodiment of the present disclosure may include a radiation feed unit 21 and a radiation antenna unit 22.

The radiation feed unit 21 may extend from one end of the substrate 10 to the center thereof and may apply electric power. As an example, the radiation feed unit 21 may be formed in the shape of a bar on the upper surface of the substrate 10 in a manner that extends a lower end portion of the substrate antenna unit 120 toward the center of the substrate antenna unit 120. The radiation feed unit 21 may be connected to a circuit on the substrate circuit unit 110, thereby applying electric power.

The radiation antenna unit 22 may be connected to the radiation feed unit 21, thereby radiating a non-directional signal according to an electric signal of the radiation feed unit 21. As an example, the radiation antenna unit 22 may include a first radiation unit 221 and a second radiation units 222. The first radiation unit 221 is formed in the shape of a circle in a manner that is connected to the radiation feed unit 21. The second radiation units 222 is formed on an edge of the first radiation unit 221 in a symmetrical manner, thereby creating a vertex.

Figure 3:
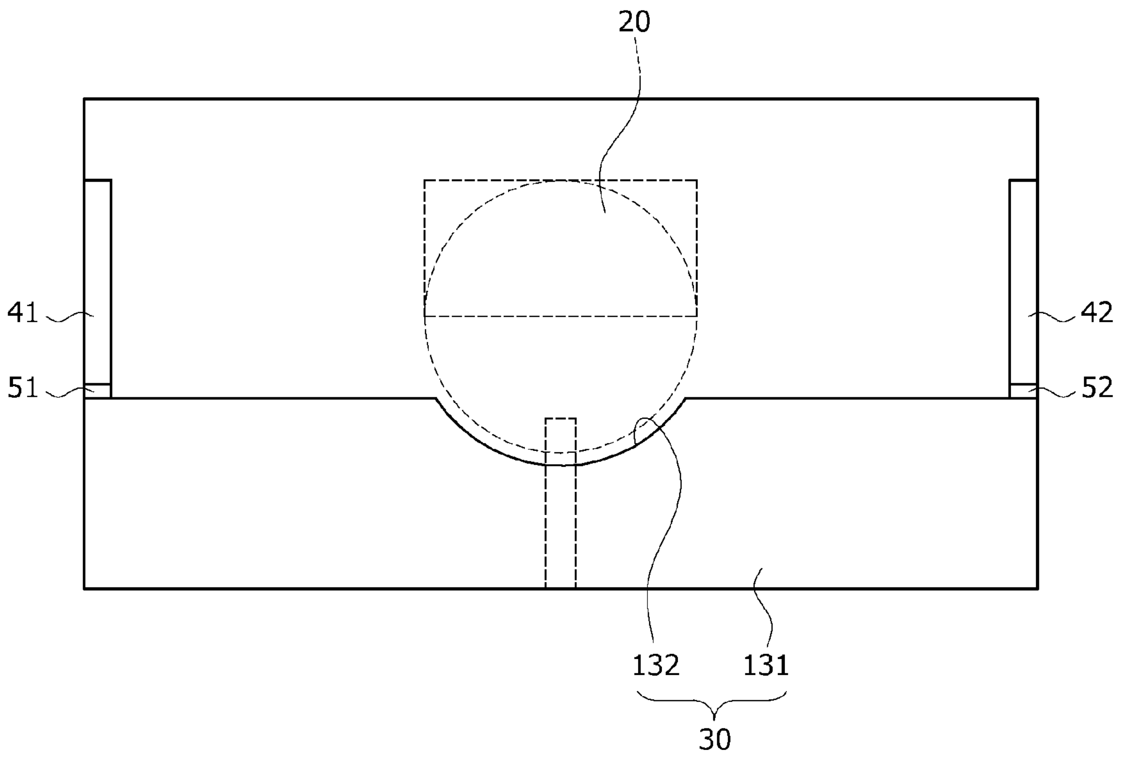
FIG. 3 is a view schematically illustrating a main grounding unit according to a first embodiment of the present disclosure.

FIG. 3 is a view schematically illustrating a main grounding unit according to a first embodiment of the present disclosure. With reference to FIG. 3, the main grounding unit 30 according to the first embodiment may include a first main grounding sub-unit 131 and a second main grounding sub-unit 132.

The first main grounding sub-unit 131 is formed on the opposite side of the substrate 10 in a manner that extends in opposite directions from the center of the substrate 10 up to both ends of the substrate 10. As an example, the first main grounding sub-unit 131 may be formed on the rear surface of the substrate 10 in a manner that extends over a distance in the leftward-rightward direction, ensuring that both end portions of the first main grounding unit extend up to the left-side and right-side edges, respectively, of the substrate 10. The first main grounding sub-unit 131 may be arranged in such a manner that an upper end thereof has a greater height than the radiation feed unit 21 and a smaller height than the center point of the radiation antenna unit 22.

The second main grounding sub-unit 132 may be concavely formed on top of the first main grounding sub-unit 131 in such a manner as not to interfere with the radiation antenna unit 22. As an example, the second main grounding sub-unit 132 may have a rounded shape at the upper center portion of the first main grounding sub-unit 131.

Figure 4:
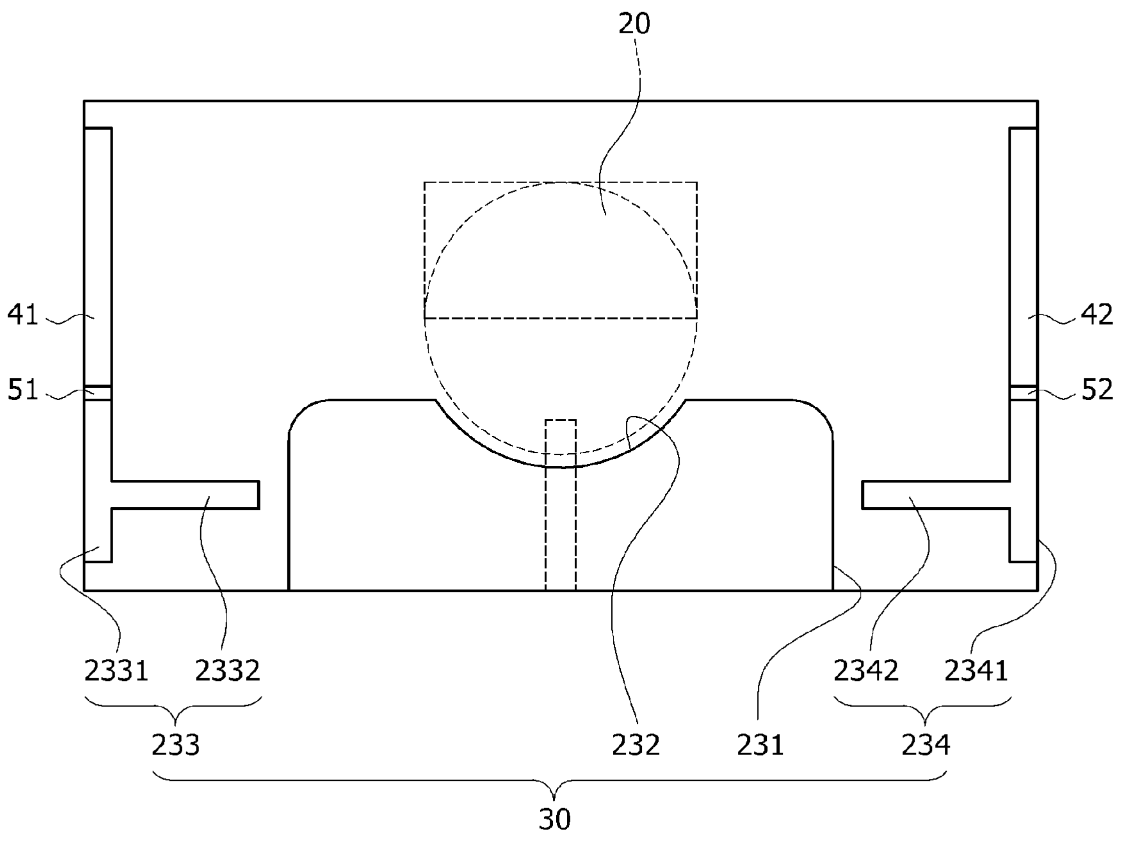
FIG. 4 is a view schematically illustrating a main grounding unit according to a second embodiment of the present disclosure.

FIG. 4 is a view schematically illustrating a main grounding unit according to a second embodiment of the present disclosure. With reference to FIG. 4, the main grounding unit 30 according to the second embodiment may include a first primary grounding sub-unit 231, a second primary grounding sub-unit 232, a third primary grounding sub-unit 233, and a fourth primary grounding sub-unit 234.

The first primary grounding sub-unit 231 may be formed on the opposite surface of the substrate 10. As an example, the first primary grounding sub-unit 231 may be formed on the rear surface of the substrate 10 in such a manner that extends over a distance in the leftward-rightward direction of the substrate 10, so that both end portions thereof are spaced away from the left-side and right-side edges, respectively, of the substrate 10. The first primary grounding sub-unit 231 may be formed in such a manner that an upper end thereof has a greater height than the radiation feed unit 21 and a smaller height than the center point of the radiation antenna unit 22.

The second primary grounding sub-unit 232 may be concavely formed on top of the first primary grounding sub-unit 231 in such a manner as not to interfere with the radiation antenna unit 22. As an example, the second primary grounding sub-unit 232 may have a rounded shape at the upper center portion of the first primary grounding sub-unit 231.

The third primary grounding sub-unit 233 may be formed on the opposite surface of the substrate 10 in a manner that is arranged on the left-side edge of the substrate 10. As an example, the third primary grounding sub-unit 233 may include a third vertical grounding sub-element 2331 and a third horizontal grounding sub-element 2332. The third vertical grounding sub-element 2331 is formed on the rear surface of the substrate 10 in a manner that extends over a distance in the upward-downward direction from the left-side edge of the substrate 10. The third horizontal grounding sub-element 2332 extends inward in the lateral direction from the third vertical grounding sub-element 2331. The third horizontal grounding sub-element 2332 may be spaced away from or connected to the left end of the first primary grounding sub-unit 231.

The fourth primary grounding sub-unit 234 is formed on the opposite surface of the substrate 10 in a manner that is arranged on the right-side edge of the substrate 10. As an example, the fourth primary grounding sub-unit 234 may include a fourth vertical grounding sub-element 2341 and a fourth horizontal grounding sub-element 2342. The fourth vertical grounding sub-element 2341 is formed on the rear surface of the substrate 10 in such a manner that it extends over a distance in the upward-downward direction from the right-side edge of the substrate 10. The fourth horizontal grounding sub-element 2342 extends inward in the lateral direction from the fourth vertical grounding sub-element 2341. The fourth horizontal grounding sub-element 2342 may be spaced away from or connected to the right end of the first primary grounding sub-unit 231.

Figure 5:
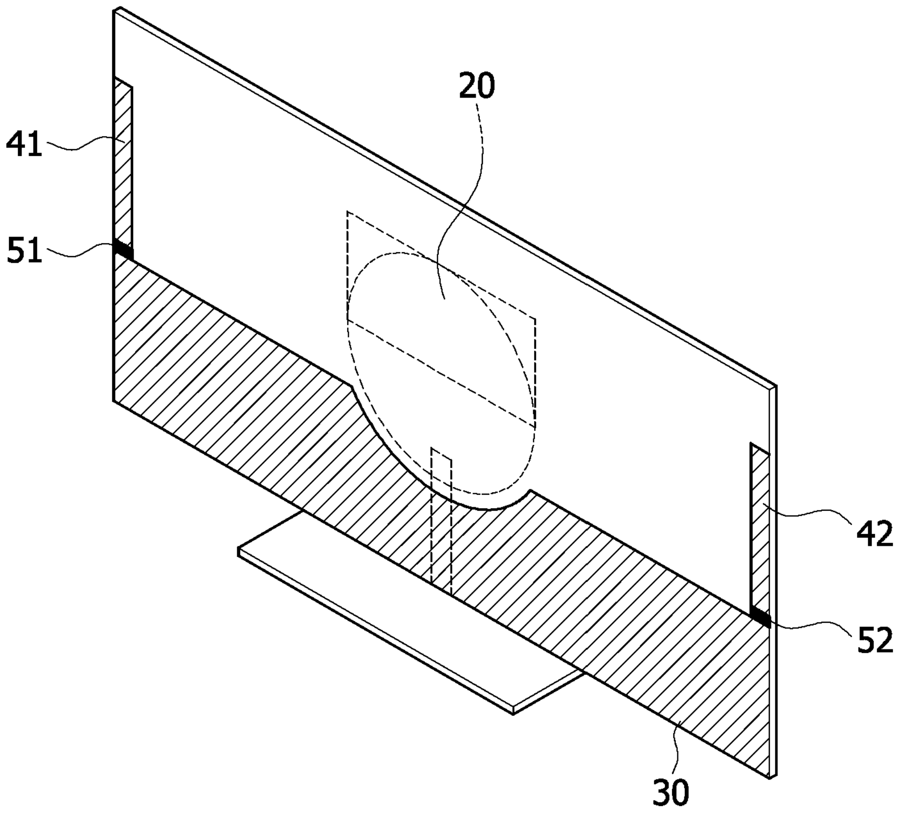
FIG. 5 is a view schematically illustrating a state where a switching antenna for vehicular UWB communication, including the main grounding unit according to the first embodiment of the present disclosure, radiates a directional radiation signal.
Figure 6:
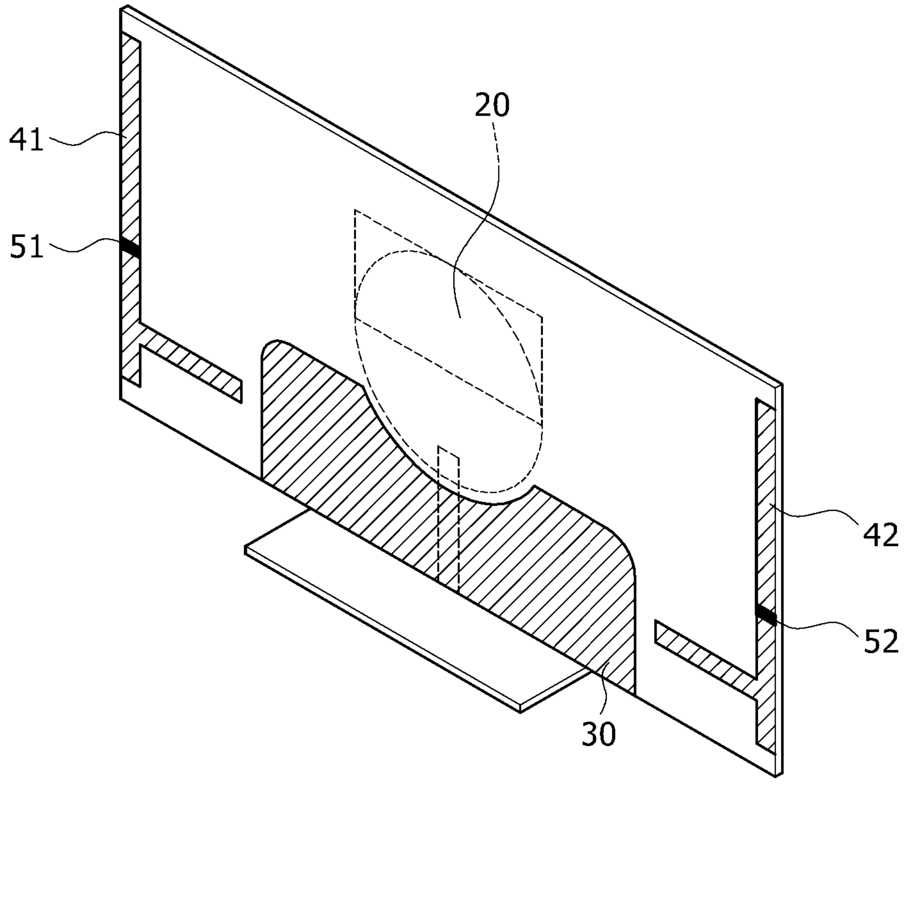
FIG. 6 is a view schematically illustrating a state where a switching antenna for vehicular UWB communication, including the main grounding unit according to the second embodiment of the present disclosure, radiates the directional radiation signal.

FIG. 5 is a view schematically illustrating a state where a switching antenna 1 for vehicular UWB communication, including the main grounding unit 30 according to the first embodiment of the present disclosure, radiates the directional radiation signal. FIG. 6 is a view schematically illustrating a state where a switching antenna 1 for vehicular UWB communication, including the main grounding unit according to the second embodiment of the present disclosure, radiates the directional radiation signal. With reference to FIGS. 5 and 6, the radiation signal of the radiation unit 20 may be directional when the first selection signal unit 51 connects the main grounding unit 30 and the first side grounding unit 41 to each other, and the second selection signal unit 52 connects the main grounding unit 30 and the second side grounding unit 42 to each other.

As an example, when electric power is simultaneously applied to the first selection signal unit 51 and the second selection signal unit 52, the main grounding unit 30 and the first side grounding unit 41 are in a state of being connected to each other, and the main grounding unit 30, and the second side grounding unit 42 are in a state of being connected to each other. In these states, the radiation signal generated by the radiation unit 20 may be radiated only to over the radiation unit 20, thereby radiating the directional signal.

Figure 7:
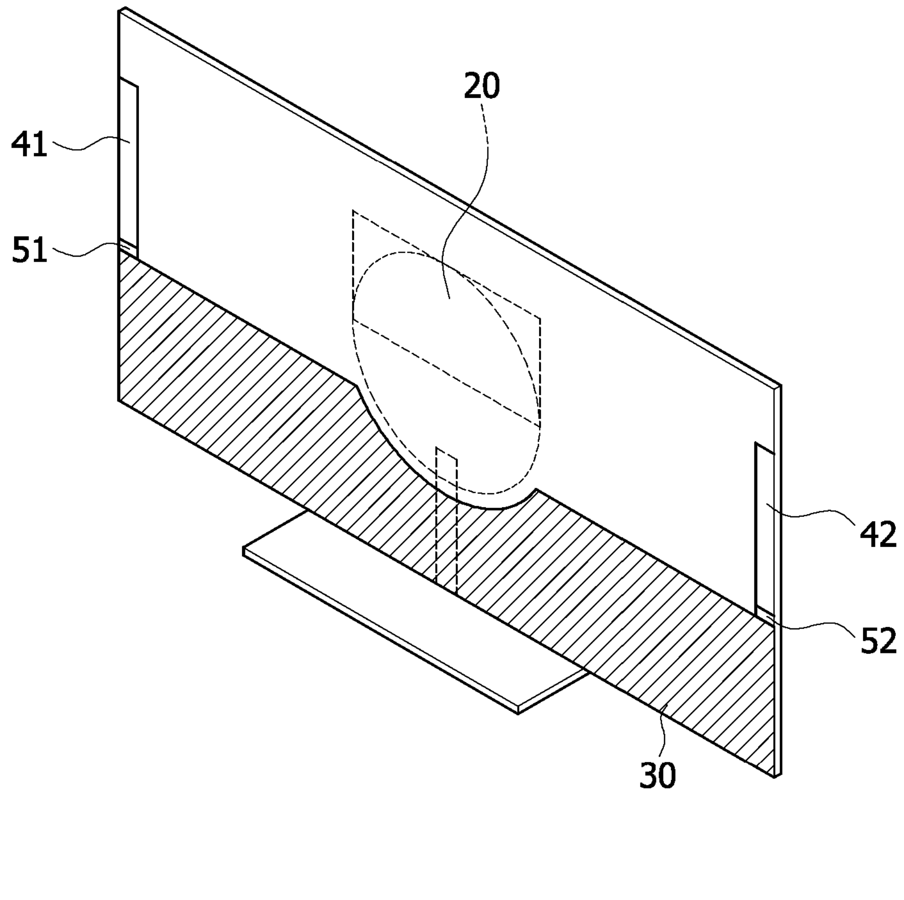
FIG. 7 is a view schematically illustrating a state where the switching antenna for vehicular UWB communication, including the main grounding unit according to the first embodiment of the present disclosure, radiates a non-directional radiation signal.
Figure 8:
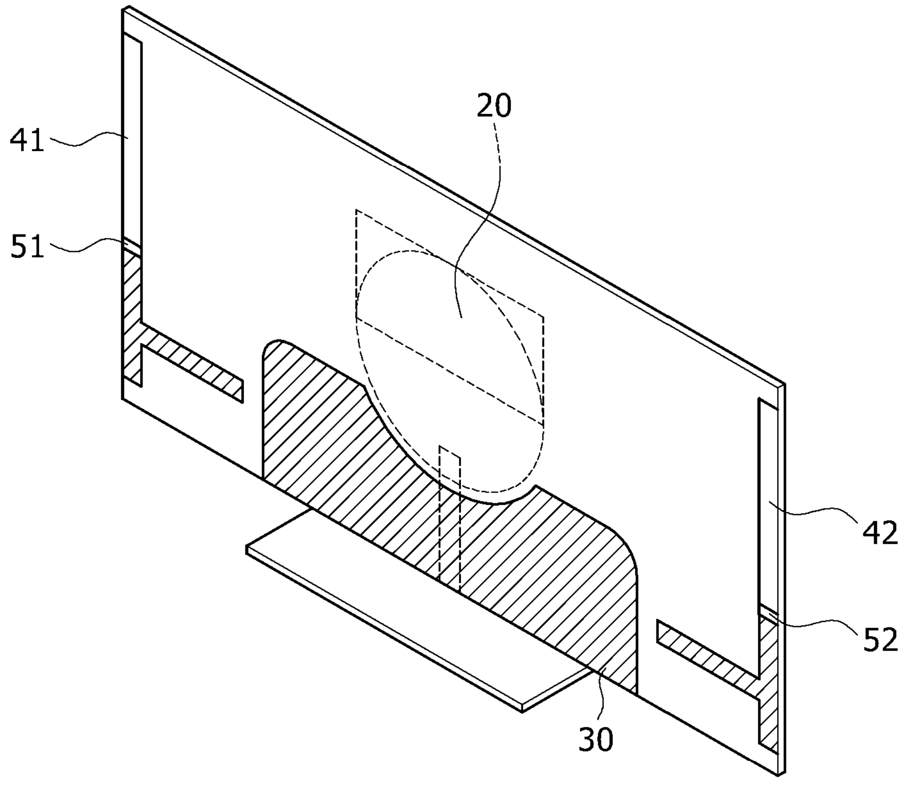
FIG. 8 is a view schematically illustrating a state where the switching antenna for vehicular UWB communication, including the main grounding unit according to the second embodiment of the present disclosure, radiates the non-directional radiation signal.

FIG. 7 is a view schematically illustrating a state where the switching antenna 1 for vehicular UWB communication, including the main grounding unit 30 according to the first embodiment of the present disclosure, radiates the non-directional radiation signal. FIG. 8 is a view schematically illustrating a state where the switching antenna 1 for vehicular UWB communication, including the main grounding unit 30 according to the second embodiment of the present disclosure, radiates the non-directional radiation signal. With reference to FIGS. 7 and 8, the radiation signal of the radiation unit may be non-directional when the first selection signal unit 51 disconnects the main grounding unit 30 and the first side grounding unit 41 from each other and the second selection signal unit 52 disconnects the main grounding unit 30 and the second side grounding unit 42 from each other.

As an example, when electric power is not simultaneously applied to the first selection signal unit 51 and the second selection signal unit 52, the main grounding unit 30 and the first side grounding unit 41 are in a state of being separated from each other, and the main grounding unit 30 and the second side grounding unit 42 are in a state of being separated from each other. In these states, the radiation signal generated by the radiation unit 20 may be radiated to over the radiation unit 20 and outward in the lateral direction of the radiation unit 20, thereby radiating the non-directional signal.

Figure 9:
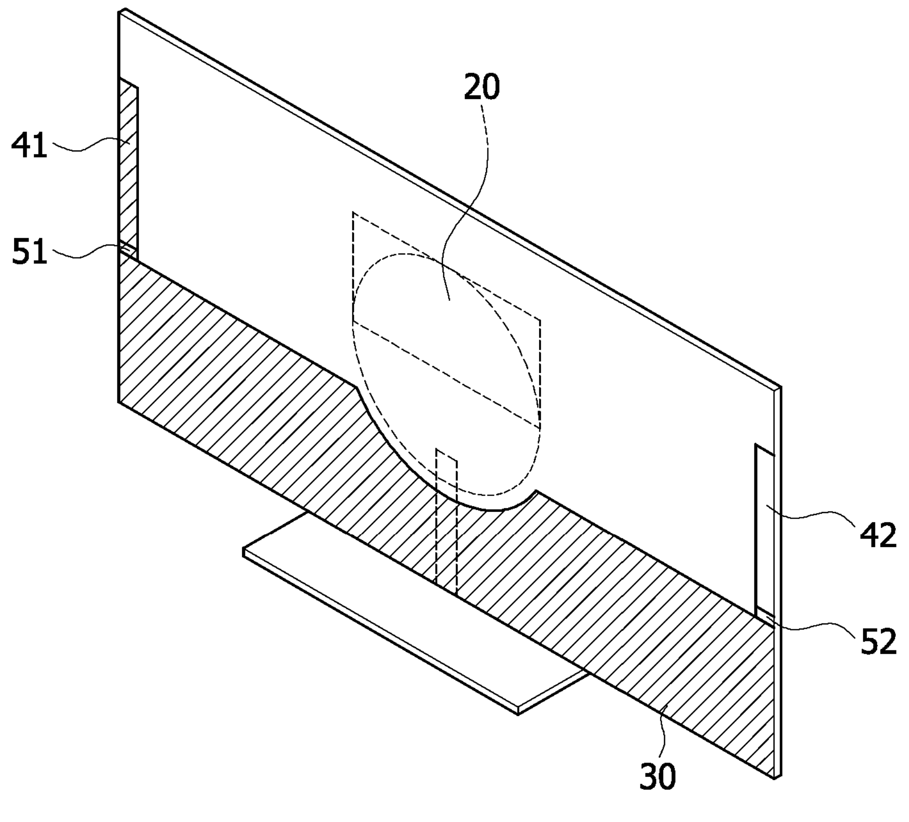
FIG. 9 is a view schematically illustrating a state where the switching antenna for vehicular UWB communication, including the main grounding unit according to the first embodiment of the present disclosure, radiates a directional radiation signal through which a trunk is detectable.
Figure 10:
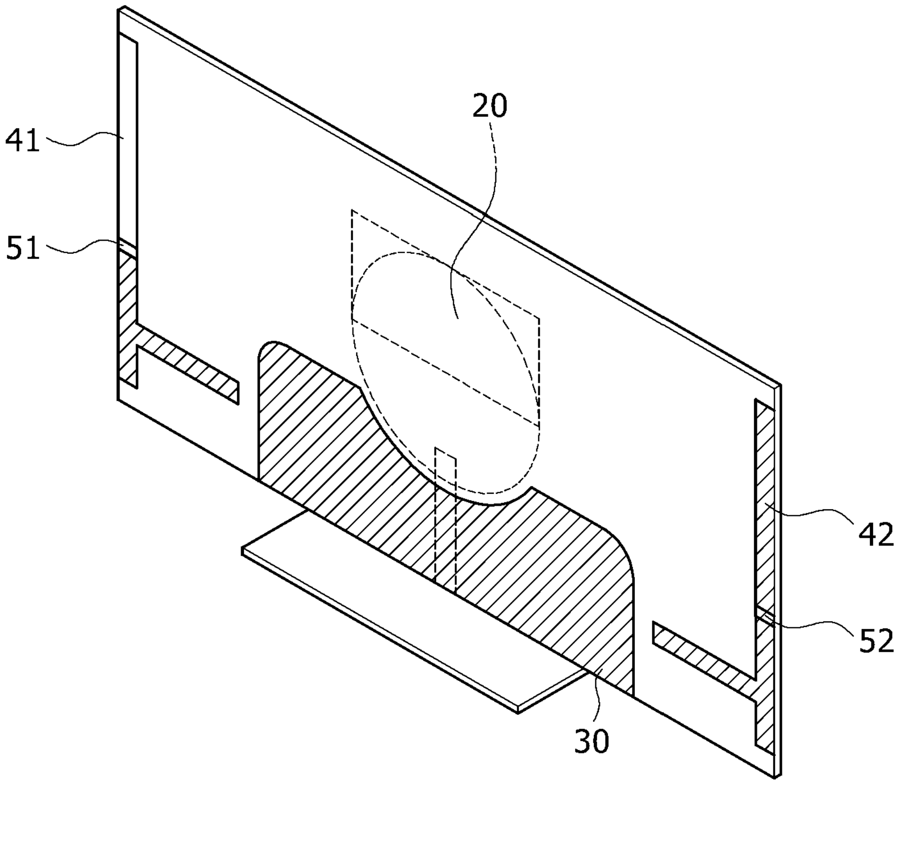
FIG. 10 is a view schematically illustrating a state where the switching antenna for vehicular UWB communication, including the main grounding unit according to the second embodiment of the present disclosure, radiates the directional radiation signal through which the trunk is detectable.

FIG. 9 is a view schematically illustrating a state where the switching antenna 1 for vehicular UWB communication, including the main grounding unit 30 according to the first embodiment of the present disclosure, radiates a directional radiation signal through which a trunk is detectable. FIG. 10 is a view schematically illustrating a state where the switching antenna 1 for vehicular UWB communication, including the main grounding unit 30 according to the second embodiment of the present disclosure, radiates the directional radiation signal through which the trunk is detectable. With reference to FIGS. 9 and 10, the radiation signal of the radiation unit 20 is so directional that the trunk is detectable through the radiation signal, when the first selection signal unit 51 connects the main grounding unit 30 and the first side grounding unit 41 to each other, and the second selection signal unit 52 disconnects the main grounding unit and the second side grounding unit 42 from each other (refer to FIG. 9). In addition, the radiation signal of the radiation unit 20 is so directional that the trunk is detectable through the radiation signal, when the second selection signal unit 52 connects the main grounding unit 30 and the second side grounding unit 42 to each other, and the first selection signal unit 51 disconnects the main grounding unit 30 and the first side grounding unit 41 from each other (refer to FIG. 10).

Operation of the switching antenna 1 for vehicular UWB communication with the structure as described above is described as follows.

The radiation unit 20 is formed on the center portion of the upper surface of the substrate 10. The main grounding unit 30 is formed on a lower portion of the rear surface of the substrate 10. The first side grounding unit 41 and the second side grounding unit 42 are formed on the left-side and right-side edges, respectively, of the rear surface of the substrate 10. In this case, the main grounding unit 30 and the first side grounding unit 41 are connected to each other by the first selection signal unit 51, and the main grounding unit 30 and the second side grounding unit 42 are connected to each other by the second selection signal unit 52.

The main grounding unit 30 and the first side grounding unit 41 are in the state of being connected to each other, and the main grounding unit 30 and the second side grounding unit 42 are in the state of being connected to each other, in a case where, in the above-mentioned state, there is a need to detect an occupant sitting on a rear seat, electric power is applied to the first selection signal unit 51 and the second selection signal unit 52. As a result, the radiation signal generated by the radiation unit 20 transforms into the directional radiation signal through the connection between the main grounding unit 30 and each of the first side grounding unit 41 and the second side grounding unit 42. Thus, through the directional radiation signal, it can be detected whether or not the occupant sits on the rear seat.

In a case where location positioning is necessary, the first selection signal unit 51 and the second selection signal unit 52 are blocked from being supplied with electric power. Thus, the main grounding unit 30 and the first side grounding unit 41 are in a state of being separated from each other, and the main grounding unit 30 and the second side grounding unit 42 are in a state of being separated from each other. As a result, the location positioning is possible with the non-directional radiation signal generated by the radiation unit 20.

Lastly, in a case where there is a need to detect the trunk, electric power is applied to only one of the first selection signal unit 51 and the second selection signal unit 52. Thus, the main grounding unit 30 is in a state of being connected to one of the first side grounding unit 41 and the second side grounding unit 42. As a result, the radiation signal radiated by the radiation unit 20 transforms into the directional radiation signal. Thus, the trunk can be detected through the directional radiation signal.

The switching antenna for vehicular UWB communication 1 according to the embodiment of the present disclosure may radiate the non-directional radiation signal or the directional radiation signal by employing the following structure. The main grounding unit 30 is formed under the radiation unit 20 radiating the non-directional radiation signal. The first side grounding unit 41 and the second side grounding unit 42 are formed on both sides, respectively, of the radiation unit 20. The main grounding unit 30 and the first side grounding unit 41 are selectively connected to or separated from each other by the first selection signal unit 51. The main grounding unit and the second side grounding unit 42 are selectively connected to or separated from each other by the second selection signal unit 52.

The embodiments of the present disclosure are described only in an exemplary manner with reference to the drawings. It would be understandable by a person of ordinary skill in the art to which the present disclosure pertains that various modifications may possibly be made to the embodiment and that various equivalents thereof may possibly be implemented. Therefore, the proper technical scope of the present disclosure should be defined by the following claims.

What is claimed is:

1. A switching antenna for vehicular Ultra-WideBand (UWB) communication, the switching antenna comprising:
   - a substrate;
   - a radiation unit formed on the substrate and configured to radiate a non-directional pattern signal;
   - a main grounding unit formed on the substrate and arranged under the radiation unit;
   - a first side grounding unit formed on the substrate and arranged to the left of the radiation unit;
   - a second side grounding unit formed on the substrate and arranged to the right of the radiation unit;
   - a first selection signal unit formed on the substrate to selectively connect the main grounding unit and the first side grounding unit to each other; and
   - a second selection signal unit formed on the substrate to selectively connect the main grounding unit and the second side grounding unit to each other, wherein a radiation signal is directional when the first selection signal unit connects the main grounding unit and the first side grounding unit to each other and when the second selection signal unit connects the main grounding unit and the second side grounding unit to each other.

2. The switching antenna of claim 1, wherein the radiation unit forms a pattern on an upper surface of the substrate.

3. The switching antenna of claim 1, wherein the radiation unit comprises:
   - a radiation feed unit extending from one end of the substrate to a center of the substrate and applying electric power; and
   - a radiation antenna unit connected to the radiation feed unit and configured to radiate a non-directional signal according to an electric signal of the radiation feed unit.

4. The switching antenna of claim 3, wherein the radiation feed unit is bar-shaped and is connected to a circuit on the substrate.

5. The switching antenna of claim 3, wherein the radiation antenna unit comprises:

a first radiation unit in the shape of a circle configured to be connected to the radiation feed unit; and a second radiation unit being symmetrical at an edge of the first radiation unit.

6. The switching antenna of claim 1, wherein the main grounding unit is formed on a rear surface of the substrate and is arranged under the radiation unit, thereby blocking a radiation signal of the radiation unit.

7. The switching antenna of claim 3, wherein the main grounding unit comprises:

a first main grounding sub-unit configured to be formed on an opposite side to a side of the substrate on which the radiation unit is formed, and extend in opposite directions from a center of the substrate up to both ends of the substrate; and a second main grounding sub-unit concavely formed on a top of the first main grounding sub-unit so as not to interfere with the radiation antenna unit.

8. The switching antenna of claim 7, wherein the first main grounding sub-unit is formed in a manner that extends over a distance in a leftward-rightward direction of the substrate, and wherein an upper end of the first main grounding sub-unit has a greater height than the radiation feed unit and a smaller height than a center point of the radiation antenna unit.

9. The switching antenna of claim 3, wherein the main grounding unit comprises:

a first primary grounding sub-unit formed on an opposite side to a side of the substrate on which the radiation unit is formed;

a second primary grounding sub-unit concavely formed on a top of the first primary grounding sub-unit so as not to interfere with the radiation antenna unit;

a third primary grounding sub-unit on the opposite side of the substrate and arranged on a left-side edge of the substrate; and a fourth primary grounding sub-unit formed on the opposite side of the substrate and arranged on a right-side edge of the substrate.

10. The switching antenna of claim 9, wherein the first primary grounding sub-unit is formed to extend over a distance in a leftward-rightward direction of the substrate, so that both ends thereof are spaced away from the left-side and right-side edges, respectively, of the substrate.

11. The switching antenna of claim 10, wherein an upper end of the first primary grounding sub-unit has a greater height than the radiation feed unit and a smaller height than the center point of the radiation antenna unit.

12. The switching antenna of claim 9, wherein the third primary grounding sub-unit comprises:

a third vertical grounding sub-element extending over a distance from the left-side edge of the substrate; and a third horizontal grounding sub-element extending inward in a lateral direction from the third vertical grounding sub-element, and wherein the third primary grounding sub-unit is spaced away from or connected to the first primary grounding sub-unit.

13. The switching antenna of claim 9, wherein the fourth primary grounding sub-unit comprises:

a fourth vertical grounding sub-element extending a distance in an upward-downward direction of the right-side edge from the substrate; and a fourth horizontal grounding sub-element extending inward in a lateral direction from the fourth vertical grounding sub-element, and wherein the fourth primary grounding sub-unit is spaced away from or connected to the first primary grounding sub-unit.

14. The switching antenna of claim 1, wherein the first side grounding unit is formed in a manner that extends over a distance in an upward-downward direction from a left-side edge of the substrate, thereby blocking a radiation signal by covering a left side of the radiation unit.

15. The switching antenna of claim 1, wherein the second side grounding unit is formed to extend over a distance in an upward-downward direction from a right-side edge of the substrate, thereby blocking a radiation signal by covering a right side of the radiation unit.

16. The switching antenna of claim 1, wherein the first selection signal unit comprises:

a first signal pattern unit connecting the main grounding unit and the first side grounding unit to each other; and a first signal application unit connected to the first signal pattern unit and configured to apply electric power to the first signal pattern unit.

17. The switching antenna of claim 1, wherein the second selection signal unit comprises:

a second signal pattern unit connecting the main grounding unit and the second side grounding unit to each other; and a second signal application unit connected to the second signal pattern unit and configured to apply electric power to the second signal pattern unit.

18. The switching antenna of claim 1, wherein a radiation signal is a non-directional signal when the first selection signal unit disconnects the main grounding unit and the first side grounding unit from each other and when the second selection signal unit disconnects the main grounding unit and the second side grounding unit from each other.

19. The switching antenna of claim 1, wherein a radiation signal of the radiation unit is a directional signal so that a trunk is detectable, if the second selection signal unit disconnects the main grounding unit and the second side grounding unit from each other when the first selection signal unit connects the main grounding unit and the first side grounding unit to each other, or if the second selection signal unit connects the main grounding unit and the second side grounding unit when the first selection signal unit disconnects the main grounding unit and the first side grounding unit from each other.

* * * * *